No. 773,306. PATENTED OCT. 25, 1904.
F. L. O. WADSWORTH.
GLASS PLATE OR SLAB.
APPLICATION FILED MAY 20, 1904.
NO MODEL.
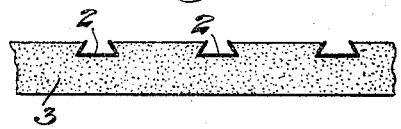
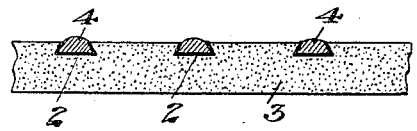
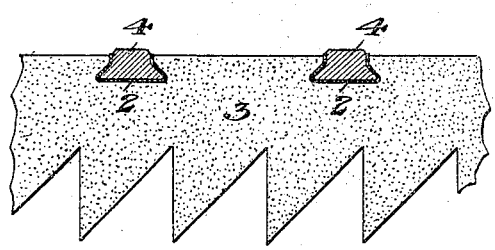
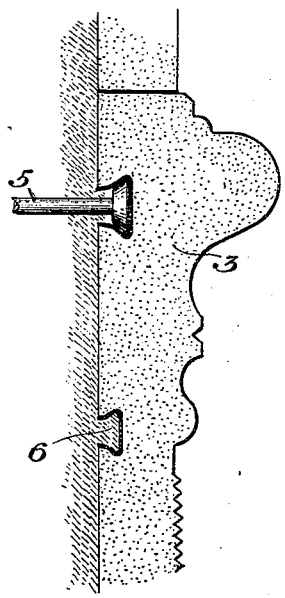
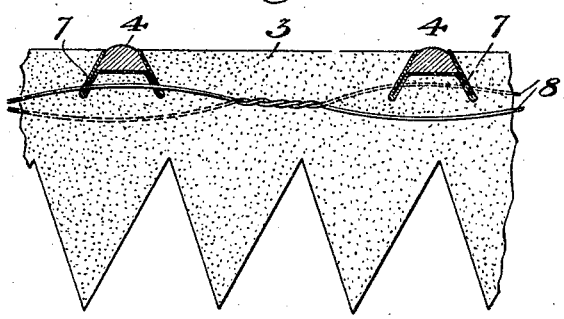
WITNESSES
Thomas W. Bakewell
L. A. Conners
INVENTOR
Frank L. O. Wadsworth No. 773,306. Patented October 25, 1904.

UNITED STATES PATENT OFFICE.

FRANK L. O. WADSWORTH, OF MORGANTOWN, WEST VIRGINIA, ASSIGNOR TO PRESSED PRISM PLATE GLASS COMPANY, OF MORGANTOWN, WEST VIRGINIA, A CORPORATION OF WEST VIRGINIA.

GLASS PLATE OR SLAB.

SPECIFICATION forming part of Letters Patent No. 773,306, dated October 25, 1904.

Application filed May 20, 1904. Serial No. 208,911. (No model.)

*To all whom it may concern:*

Be it known that I, FRANK L. O. WADSWORTH, of Morgantown, Monongalia county, West Virginia, have invented a new and useful Glass Plate or Slab, of which the following is a full, clear, and exact description, reference being had to the accompanying drawings, forming part of this specification, in which—

Figure 1 is a vertical section showing a glass sheet provided with my improvement. Fig. 2 is a similar view showing the metal-lined grooves filled with soft metal or like material for the purpose of affording walking-surface to pavement or floor lights. Fig. 3 is a similar view showing the device of Fig. 2 applied to prism-glass. Fig. 4 is a vertical section showing my invention employed as a retaining device by which glass blocks or slabs may be fastened to walls or other surfaces. Fig. 5 is a sectional view showing my improvement when combined with a wire mesh embedded in the glass for the purpose of giving it added strength or cohesiveness. Fig. 6 is a detail view showing a modified form of the metal lining.

My invention consists in a glass sheet, slab, or block having a grooved surface with metal lining embedded and retained in the glass by projections.

The invention is useful for the manufacture of glass blocks or slabs for floor-lights or pavement-lights where the grooves are employed to retain the soft-metal filling, in which case the blocks or slabs may be plain or may have prism-surfaces, as desired. It may also be employed as a means of detaching or supporting glass slabs or blocks on walls or the like.

In the manufacture of the glass I take a metal strip or strips 2 of trough form and preferably of dovetail form, as shown in Figs. 1, 2, and 3, although the strip may be of rectangular form with projections or key portions 2', as shown in Fig. 6. I place such strip or strips on the table of a glass-pressing or glass-rolling machine and form around them a slab or plate 3 of glass of the desired dimensions. The glass may have a plain surface, as shown in Figs. 1 and 2, or it may have a prism-surface, as in Figs. 3 and 5, or it may have an ornamental surface, as in Fig. 4. The plate or slab so formed has on one surface open grooves lined with the troughs 2, embedded in the body of the glass. Where the glass is to be employed as a floor or pavement light, I fill the lined grooves with a filling 4 of lead, cement, or other soft material, as shown in Figs. 2 and 3. This projects above the surface and affords a non-slipping surface. As it wears down it may readily be replaced by inserting fresh materials in the grooves. Where the device is to be used as means of support, as shown in Fig. 4, I place the heads of nails or screws 5 in the metal-lined groove, or I may use the groove to receive a key of cement, as shown at 6 in Fig. 4. Where the troughs are to be combined with wire mesh, as above stated, I form them, as in Fig. 5, with projecting portions or flanges 7, into which the wires 8 of a mesh are threaded, and the wire mesh, with the attached trough or lining, are then embedded in the glass in a manner analogous to that now employed in the manufacture of wire-glass. The wire mesh strengthens the glass and if the glass is broken holds the particles together.

The shape and place of application of the linings may be varied by those skilled in the art, since

What I claim is—

1. As an article of manufacture a grooved glass slab or block and metal lining therefor embedded in the body of the glass; substantially as described.

2. As an article of manufacture a grooved glass slab or block, metal lining therefor embedded in the glass, and a filling in the lining; substantially as described.

In testimony whereof I have hereunto set my hand.

FRANK L. O. WADSWORTH.

Witnesses:
 THOMAS W. BAKEWELL,
 GEO. B. BLEMING.